US006740188B2

(12) United States Patent
Allwein et al.

(10) Patent No.: US 6,740,188 B2
(45) Date of Patent: May 25, 2004

(54) COMPRESSION-CUTTING AND FACING METHOD

(75) Inventors: Robert J. Allwein, Littleton, CO (US); Blake Boyd Bogrett, Littleton, CO (US)

(73) Assignee: Johns Manville International, Inc., Denver, CO (US)

( * ) Notice: Subject to any disclaimer, the term of this patent is extended or adjusted under 35 U.S.C. 154(b) by 34 days.

(21) Appl. No.: 10/158,307

(22) Filed: May 29, 2002

(65) Prior Publication Data

US 2003/0221772 A1 Dec. 4, 2003

(51) Int. Cl.[7] ........................ B32B 31/18; B32B 19/00; B32B 5/08; E04B 1/78; E04B 1/80

(52) U.S. Cl. ...................... 156/250; 156/252; 156/257; 156/259; 428/43; 428/357; 428/375; 428/98; 428/56; 52/404.1; 52/742.1; 52/746.1

(58) Field of Search ............................... 156/62.2, 250, 156/252, 253, 257, 259, 256, 268; 428/43, 54, 56, 357, 364, 374, 403, 404, 920, 167, 98, 375; 52/404.1, 742.1, 746.1, 404.3, 743, 742

(56) References Cited

U.S. PATENT DOCUMENTS

| | | | | | |
|---|---|---|---|---|---|
| 2,335,968 | A | | 12/1943 | Sawtell | |
| 3,958,385 | A | * | 5/1976 | Bondra et al. | 52/404.1 |
| 4,756,945 | A | * | 7/1988 | Gibb | 428/124 |
| 4,866,905 | A | | 9/1989 | Bihy | |
| 5,331,787 | A | * | 7/1994 | Paulitschke et al. | 52/746.1 |
| 5,545,453 | A | | 8/1996 | Grant | |
| 5,567,504 | A | | 10/1996 | Schakel | |
| 6,083,594 | A | * | 7/2000 | Weinstein et al. | 428/43 |
| 6,128,884 | A | * | 10/2000 | Berdan et al. | 52/742.12 |
| 6,165,305 | A | | 12/2000 | Weinstein | |
| 6,551,677 | B2 | * | 4/2003 | Weinstein et al. | 428/43 |

FOREIGN PATENT DOCUMENTS

| | | | |
|---|---|---|---|
| DE | 7830852 | U1 | 1/1979 |
| DE | 3118597 | A1 | 5/1981 |
| DE | 3203624 | A1 | 4/1983 |
| DE | 3229601 | A1 | 2/1984 |
| DE | 19700373 | A1 | 2/1998 |
| DE | 29822362 | U1 | 5/1999 |
| DE | 19914782 | A1 | 10/2000 |

* cited by examiner

*Primary Examiner*—J. A. Lorengo
(74) *Attorney, Agent, or Firm*—Robert D. Touslee

(57) ABSTRACT

A resilient fibrous insulation blanket is compression-cut longitudinally at one and typically a plurality of laterally spaced apart locations to form a form a pre-cut fibrous insulation blanket having a plurality of blanket sections that can be separated from each other by hand. The compression cutting of the blanket to form the blanket sections causes a first major surface of the blanket to become temporarily deformed and destabilized. When the blanket is faced, the facing is applied to the other major surface of the blanket while the first major surface is still deformed. Where the blanket is formed from a wider blanket, the wider blanket is at least partially cut prior to the compression-cutting operation to reduce lateral stresses in the blanket when the blanket is compression-cut.

15 Claims, 4 Drawing Sheets

FIG. 1
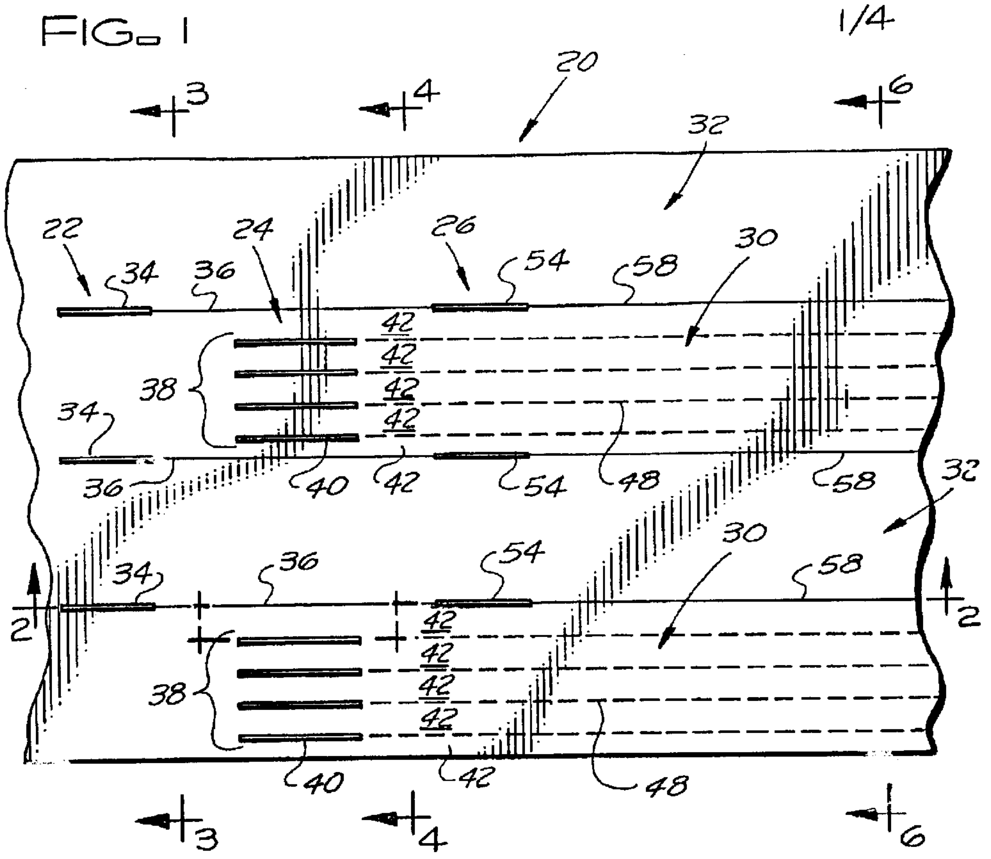
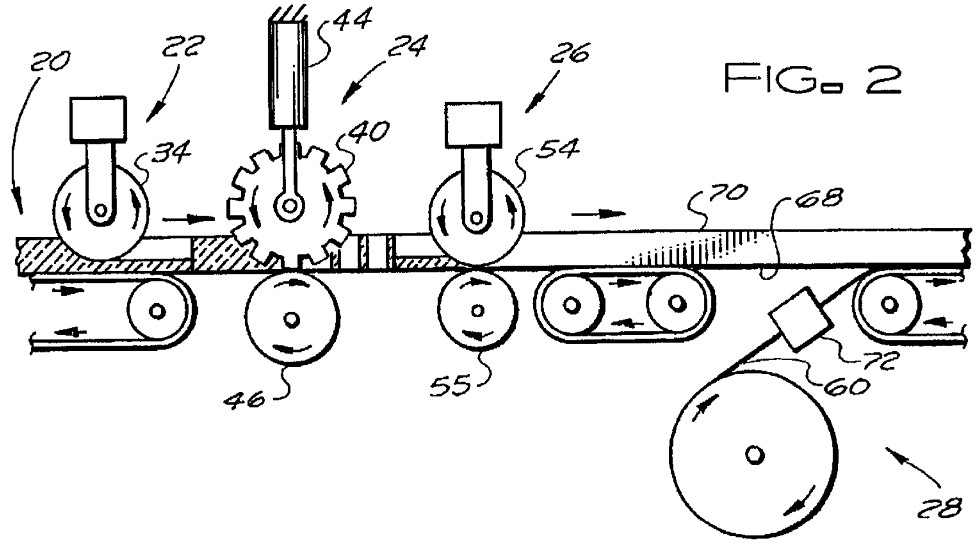
FIG. 2

FIG. 8
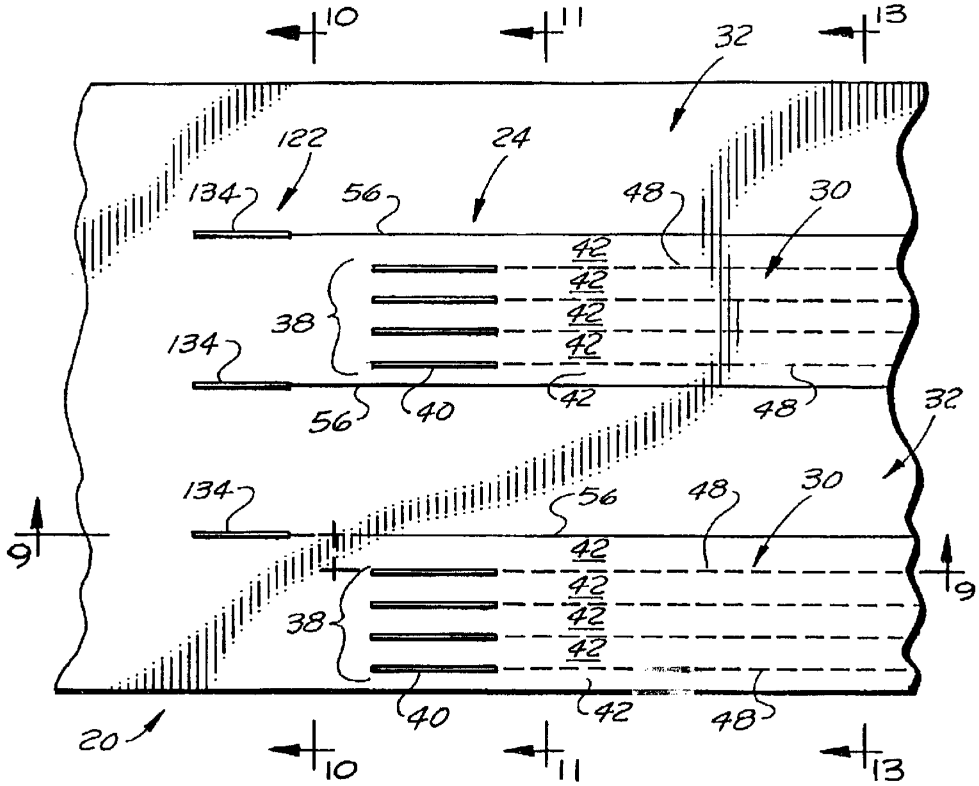
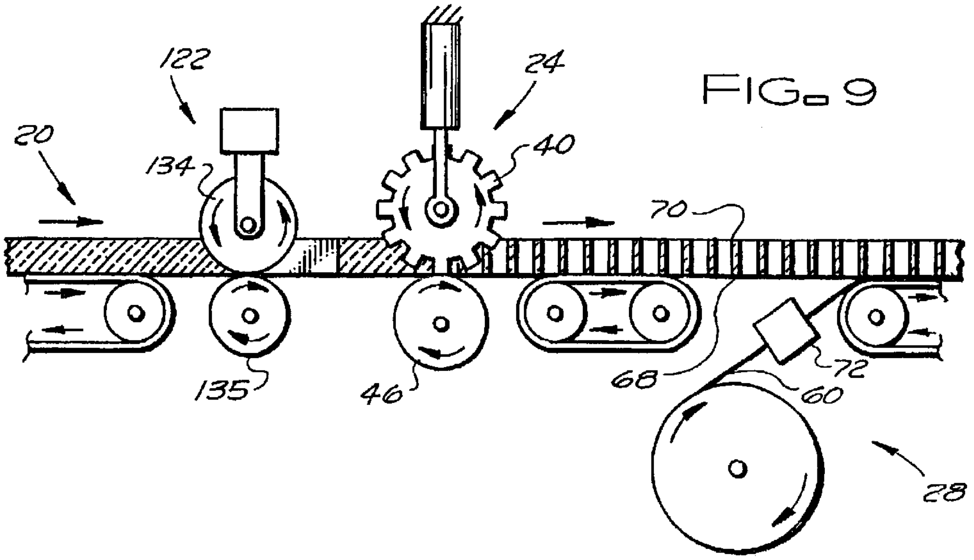
FIG. 9

COMPRESSION-CUTTING AND FACING METHOD

BACKGROUND OF THE INVENTION

The subject invention relates to a method of forming a plurality of pre-cut and conventional uncut resilient fibrous insulation blankets from a wider resilient fibrous insulation blanket without setting up stresses in the blanket during the formation of the pre-cut and conventional uncut resilient fibrous insulation blankets that would adversely affect the integrity of the blanket and the pre-cut and conventional uncut resilient fibrous insulation blankets. The subject invention also relates to a method of facing the pre-cut and conventional uncut resilient fibrous insulation blankets.

Fibrous insulation blankets, such as glass fiber insulation blankets in batt or roll form are typically used to insulate the walls, ceiling, floors and roofs of homes and other residential building structures as well as for other similar insulating applications. A pre-cut fibrous insulation blanket and, in particular, a pre-cut resilient glass fiber insulation blanket has recently been developed which contains a plurality of laterally spaced apart longitudinally extending series of cuts and separable connectors that enable the insulation blanket to be handled and installed as a unit or readily separated by hand along one of the longitudinally extending series of cuts and separable connectors into resilient blanket sections having widths less than the width of the pre-cut resilient fibrous insulation blanket. These pre-cut resilient fibrous insulation blankets enable insulation contractors to size the insulation blankets in width to insulate both standard width and narrower non-standard width building cavities formed by the framework of a building, such as external wall cavities of a residential building that are defined by the wall studs, without having to cut the insulation blankets in the field. By eliminating the need to cut the insulation blankets in the field, the pre-cut resilient fibrous insulation blankets eliminate a safety hazard associated with the use of knives or other sharp cutting implements to cut insulation blankets in the field, greatly reduce the time required to insulate such cavities, and reduce unwanted scrap. Since the majority of cavities to be insulated in a normal application have substantially standard cavity widths (nominal widths of 14½ or 22½ inches), standard width pre-cut resilient fibrous insulation blankets having nominal widths of 15 or 23 inches are typically packaged with standard width conventional uncut resilient fibrous insulation blankets having nominal widths of 15 or 23 inches in a ratio of 25% to 50% pre-cut resilient fibrous insulation blankets to 75% to 50% conventional uncut resilient fibrous insulation blankets. The conventional uncut resilient fibrous insulation blankets are used to insulate standard width and substantially standard width cavities and the pre-cut resilient fibrous insulation blankets are used to insulate both the standard width cavities and narrower cavities of substantially any width. For best results, each series of longitudinally extending cuts and separable connectors in the pre-cut resilient fibrous insulation blankets should have separable connectors that have the integrity to hold the blanket sections together for handling and installation as a unit for insulating a standard width cavity while being readily tearable or separable, without the formation of tear outs, to enable the pre-cut resilient fibrous insulation blankets to be separated along any one of the laterally spaced apart longitudinally extending cuts and separable connectors in the blanket to form insulation blanket sections of lesser widths for insulating nonstandard width cavities.

For economy of manufacture and to produce the desired ratio of standard width pre-cut and conventional uncut resilient fibrous insulation blankets required for packaging and distribution, a plurality of the standard width pre-cut and conventional uncut resilient fibrous insulation blankets can be made in an on line manufacturing operation from a resilient fibrous insulation blanket having a width several times the widths of the standard width pre-cut and conventional uncut resilient fibrous insulation blankets made from the blanket. When making the plurality of pre-cut and conventional uncut resilient fibrous insulation blankets from the wider resilient insulation blanket, one method of forming the plurality of laterally spaced apart longitudinally extending series cuts and separable connectors for each pre-cut resilient fibrous insulation blanket is by compression-cutting. In the compression-cutting operation, one or more portions of the wider resilient fibrous insulation blanket of a selected lateral width or widths are passed between a plurality of laterally spaced apart compression cutting blades and an anvil that cooperate to form a plurality of laterally spaced apart longitudinally extending series cuts and separable connectors in the blanket portion(s). However, during the formation of the plurality of laterally spaced apart series of cuts and separable connectors in the blanket portions, the blanket is subjected to extreme compression at each of the laterally spaced apart locations in the blanket portions where the compression-cutting blades and anvil are cutting the blanket. The extreme compression of these laterally spaced apart locations in the blanket portions by the compression-cutting operation, relative to the uncompressed or less compressed regions of the blanket, intermediate where the longitudinally extending series of cuts and separable connectors are being formed, set up lateral stresses in the blanket. These lateral stresses can be sufficiently great to degrade the integrity of the blanket in two ways. First the lateral stresses can pull the blanket apart at and adjacent to a major surface of the blanket and form longitudinally extending separations or cracks in the blanket. Secondly, since the randomly oriented fibers in these resilient fibrous insulation blankets predominately lie in layers oriented substantially parallel to the major surfaces of the blanket, the lateral stresses in the blanket can cause an internal delamination of these fibrous blanket layers within the blanket. Both of these conditions can adversely affect the integrity of the blanket and the pre-cut and conventional uncut resilient fibrous insulation blankets made from the blanket.

Compression-cutting a resilient fibrous insulation blanket to form a plurality of laterally spaced apart series of cuts and separable connectors in the blanket, such as discussed in the previous paragraph, can cause an additional problem when major surfaces of the pre-cut resilient fibrous insulation blanket(s) and the adjacent conventional uncut resilient fibrous insulation blanket(s) are to be faced. In manufacturing operations, when being faced, the major surfaces of resilient fibrous insulation blankets are normally substantially flat or planar and stable (not in the process of recovery). This permits a facing being applied to a major surface of any of these blankets to be easily and accurately aligned with and securely bonded to the major surface of the blanket. Due to the extreme compression of the laterally spaced apart locations in the blanket portions during the compression-cutting operation discussed in the previous paragraph, the major surface of the blanket penetrated by the compression-cutting blades temporarily becomes uneven and destabilized with depressed portions separated by generally rounded elevated portions. While the resilient fibrous insulation blanket eventually recovers and the major surface later returns to its generally flat or planar state, any attempt to apply a facing to the major surface of the blanket while the blanket and the uneven and destabilized surface of the blanket is in the process of recovery presents problems. First with the surface destabilized and in the process of returning to its unstressed state, it is difficult to properly align a facing with the major surface of the blanket so that the facing will be properly positioned on the major surface of the blanket to function as an effective vapor barrier when the recovery of the blanket is complete. Secondly, with the destabilized major surface of the blanket uneven and in the process of returning to its unstressed state, the bond between the facing and the major surface of the blanket can be compromised and/or the facing can keep the surface from returning to its initial planar state thereby adversely affecting the appearance of the faced resilient fibrous insulation blanket.

SUMMARY OF THE INVENTION

The method of the subject invention solves the above-discussed problems associated with: a) forming a plurality of pre-cut and conventional uncut resilient fibrous insulation blankets from a wider resilient fibrous insulation blanket without setting up stresses in the blanket during the formation of the pre-cut and conventional uncut resilient fibrous insulation blankets that would adversely affect the integrity of the blanket and the pre-cut and conventional uncut resilient fibrous insulation blankets; and b) facing the pre-cut and conventional uncut resilient fibrous insulation blankets made from the wider blanket.

In the formation of the plurality of pre-cut and conventional uncut resilient fibrous insulation blankets from a wider resilient fibrous insulation blanket according to the method of the subject invention, preferably, one or more pre-cut resilient fibrous insulation blankets and one or more conventional uncut resilient fibrous insulation blankets are made from the wider resilient fibrous insulation blanket with the pre-cut resilient fibrous insulation blanket(s) and the conventional uncut resilient fibrous insulation blanket(s) alternating across the width of the wider resilient fibrous insulation blanket. To prevent excessive stresses from building up in the wider resilient fibrous insulation blanket during the compression-cutting operation that would adversely affect the integrity of the blanket and the pre-cut and conventional uncut resilient fibrous insulation blankets made from the wider resilient fibrous insulation blanket, one or more longitudinally extending stress relieving cuts that pass at least partially through and preferably, completely through the thickness of the wider resilient fibrous insulation blanket are made in the wider resilient fibrous insulation blanket prior to the compression-cutting operation. These stress relieving cuts are made at laterally spaced apart locations intermediate lateral edges of the wider resilient fibrous insulation blanket which become the lateral edges of the pre-cut and conventional uncut resilient fibrous insulation blankets made from the wider resilient fibrous insulation blanket. The longitudinally extending stress relieving cuts are made in a first major surface of the uncut resilient fibrous insulation blanket that also forms a first major surface of each of the pre-cut and conventional uncut resilient fibrous insulation blankets made from the blanket. The stress relieving cuts are made in the wider resilient fibrous insulation blanket within a selected lateral distance of the compression-cuts to be subsequently made in portions the blanket to form the series of cuts and separable connectors of the pre-cut resilient fibrous insulation blanket(s) and relieve lateral stresses in the resilient fibrous insulation blankets that could adversely affect the integrity of the blanket and the pre-cut and conventional uncut resilient fibrous insulation blankets made from the wider resilient fibrous insulation blanket. Where there is only a partial cut prior to compression-cutting the portions of the blanket that become the pre-cut resilient fibrous insulation blanket(s), the circular compression-cutting blades of the compression-cutting assembly penetrate the same major surface of the pre-cut resilient fibrous insulation blanket(s) that contains the partial cut(s) and the blanket is fully cut along the partial cut(s) prior to applying any facing to the pre-cut and conventional uncut resilient fibrous insulation blankets made from the wider resilient fibrous insulation blanket.

The method of the subject invention can also include facing the pre-cut fibrous insulation blanket(s) and any conventional uncut resilient fibrous insulation blanket(s) made from a wider resilient fibrous insulation blanket. The compression-cut blanket portions that are made into the pre-cut resilient fibrous insulation blanket(s) are compression-cut between circular compression-cutting blades and an anvil. The compression-cutting operation forms one and typically at least two spaced apart series of longitudinally extending cuts and separable connectors in the blanket portions that become the pre-cut resilient fibrous insulation blanket(s) and forms two and typically at least three separable resilient fibrous insulation blanket sections in each of the blanket portions that become the pre-cut resilient fibrous insulation blankets. The circular compression-cutting blades penetrate the portions of the wider resilient fibrous insulation blanket being made into the pre-cut resilient fibrous insulation blanket(s) from a first major surface of the wider resilient fibrous insulation blanket, the anvil supports a second major surface of the wider resilient fibrous insulation blanket, and the compression-cutting of the wider resilient fibrous insulation blanket temporarily depresses the first major surface of the wider resilient fibrous insulation blanket and the pre-cut fibrous insulation blankets being made from the blanket along each series of cuts and separable connectors so that the first major surface of each of the pre-cut resilient fibrous insulation blankets is temporarily destabilized and temporarily no longer substantially flat or planar.

Before the first major surfaces of the pre-cut resilient fibrous insulation blankets made from the wider resilient fibrous insulation blanket have recovered to the substantially planar condition and become stabilized, longitudinally separable facings are applied and adhered to the second major surfaces of each of the pre-cut resilient fibrous insulation blankets with the facings being longitudinally separable at each of the series of cuts and separable connectors in each of the pre-cut resilient fibrous insulation blankets. By applying the facings to the second major surfaces of the pre-cut resilient fibrous insulation blankets formed from the wider resilient fibrous insulation blanket which are still planar and stabilized, the facings can be easily and precisely aligned with the pre-cut resilient fibrous insulation blankets so that the facings overlay substantially the entire major surfaces to function as a vapor barrier and are separable along each of the series of cuts and separable connectors in the pre-cut resilient fibrous insulation blankets.

BRIEF DESCRIPTION OF THE DRAWINGS

FIG. 1 is a schematic plan view of a portion of production line containing a partial-cut stress relieving station, a compression-cutting station, a full cut severing station, and a facing application station.

FIG. 2 is a schematic longitudinally extending cross sectional view of the portion of the production line shown in FIG. 1. The cross section is offset to illustrate a compression-cutting blade and anvil of a compression-cutting assembly as well as rotary saw assemblies of the partial-cut stress relieving station and the full cut severing station.

FIG. 8 is a schematic plan view of a portion of production line containing a full cut stress relieving and severing station, a compression-cutting station, and a facing application station.

FIG. 9 is a schematic longitudinally extending cross sectional view of the portion of the production line shown in FIG. 8. The cross section is offset to illustrate a compression-cutting blade and anvil of a compression-cutting assembly as well as a rotary saw assembly of the full cut stress relieving and severing station.

DESCRIPTION OF THE PREFERRED EMBODIMENTS

Figure 3:
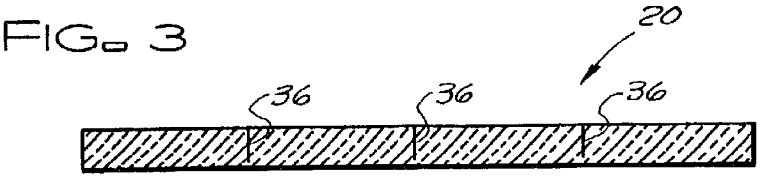
FIG. 3 is a schematic transverse cross section of the blanket being processed in FIG. 1 taken substantially along lines 3—3 of FIG. 1.
Figure 4:
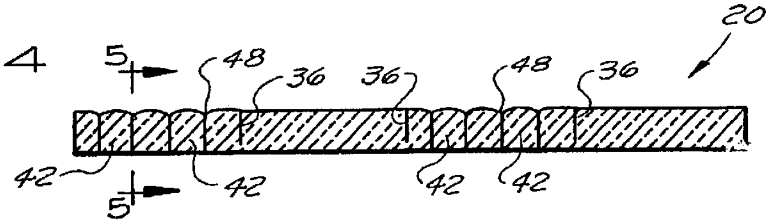
FIG. 4 is a schematic transverse cross section of the blanket being processed in FIG. 1 taken substantially along lines 4—4 of FIG. 1.

The individual faced and unfaced pre-cut and conventional uncut resilient fibrous insulation blankets formed by the method of the subject invention typically have nominal widths of 15 inches and 23 inches. The pre-cut resilient fibrous insulation blankets 30 may be used to insulate cavities of any width up to about 15 inches and about 23 inches and the conventional uncut resilient fibrous insulation blankets 32 are used to insulate cavities having widths of about 14½ to 15 inches and about 22½ to 23 inches (standard width cavities). For economy of manufacture, the individual pre-cut resilient fibrous insulation blankets 30 and conventional uncut resilient fibrous insulation blankets 32 are normally formed from a much wider resilient fibrous insulation blanket 20 e.g. a blanket up to 8 to 12 feet wide. The compression-cutting assembly for forming the plurality of laterally spaced apart series of cuts and separable connectors in the portions of the wider blanket that become the pre-cut resilient fibrous insulation blankets includes separate sets 38 of compression-cutting blades for forming the plurality of laterally spaced apart longitudinally extending series 48 of cuts and separable connectors in these blanket portions. The lateral spacing between the compression-cutting blades in each of these sets 38 of compression-cutting blades is typically between 3 inches and 4½ inches. It is believed that the relatively close lateral proximity of the compression-cutting blades to each other in each set 38 of compression-cutting blades compresses the blanket intermediate the compression-cutting blades as well as at the compression cutting blades to reduce the lateral stresses formed in the blanket intermediate the compression-cutting blades and thereby averts the formation of stresses in this portion blanket sufficient to pull apart the blanket to form longitudinally extending cracks in and adjacent the major surface of the blanket penetrated by the compression-cutting blades and the internal delamination of the blanket.

Where a pre-cut resilient fibrous insulation blanket 30, rather than an uncut conventional resilient fibrous insulation blanket 32, is being formed from the wider blanket 20 adjacent a lateral edge of the wider blanket, the lateral edge portion of the wider blanket intermediate the outermost compression-cutting blades of the compression-cutting assembly and the lateral edge of the wider blanket is also typically 3 to 4½ inches or less in width and the region of this lateral edge portion of the wider blanket from about midway or more through the thickness of the blanket to the major surface penetrated by the compression-cutting blades is free to move laterally toward the outermost compression-cutting blades of the compression-cutting assembly during the compression-cutting operation. This lateral movement of the lateral edge portion of the wider blanket 20 averts the formation of stresses in the blanket intermediate the outermost compression-cutting blades of the compression-cutting assembly and the lateral edge of the blanket which would pull apart the blanket to form longitudinally extending cracks in and adjacent the major surface of the blanket penetrated by the compression-cutting blades and internally delaminate the blanket.

The portions of the wider blanket 20 intermediate the sets 38 of compression-cutting blades forming the plurality of laterally spaced apart longitudinally extending series 48 of cuts and separable connectors in the blanket portions that become the pre-cut resilient fibrous insulation blankets 30 present a unique problem. These blanket portions are each formed either by portions of the wider blanket that are made into a conventional uncut resilient fibrous insulation blanket 32 plus the adjacent lateral edge sections of the pre-cut resilient fibrous insulation blankets 30 that are made adjacent the conventional uncut resilient fibrous insulation blanket or, where a conventional uncut resilient fibrous insulation blanket is not being made, by portions of the wider blanket that are made into the lateral edge sections of adjacent pre-cut resilient fibrous insulation blankets 30. Without stress relief, the relatively extreme compression of the wider blanket at the sets of compression-cutting blades relative the blanket portions intermediate the sets of compression-cutting blades, sets up lateral stresses in the blanket intermediate the sets of compression-cutting blades. These lateral stresses are set up, predominately, from about midway to about four fifths of the way through the thickness of the blanket to the major surface of the blanket penetrated and compressed by the sets of compression-cutting blades. In many instances, these lateral stresses can become sufficiently great to pull apart the blanket 20 to form longitudinally extending cracks in and adjacent the major surface of the blanket penetrated and compressed by the compression-cutting blades of the compression-cutting assembly and can internally delaminate the blanket. The density, thickness, and rigidity of the wider blanket 20 being formed into the pre-cut and conventional uncut resilient fibrous insulation blankets 30 and 32 all have a bearing on the magnitude of the stresses set up in the blanket. The more dense, more rigid and/or the thicker the blanket 20, the greater the magnitude of the stresses set up in the blanket by the compression-cutting operation.

Typically, the lateral distance between the sets 38 of compression-cutting blades forming the series of cuts and separable connectors in portions of the wider blanket 20 that are to become the individual pre-cut resilient fibrous insulation blankets 30 is about 6 to 8 inches where no conventional uncut resilient fibrous insulation blankets 32 are being made intermediate the pre-cut resilient fibrous insulation blankets or about 21 or more inches where conventional uncut resilient fibrous insulation blankets 32 are being made in the wider blanket 20 intermediate the pre-cut resilient fibrous insulation blankets 30. Unlike the relatively close spacing between the compression-cutting blades within a set 38 of compression cutting blades that sufficiently compresses the blanket intermediate the compression-cutting blades to prevent the formation of excessive lateral stresses, these distances of 6 to 8 inches and 21 inches or more may be sufficient to cause a difference in blanket compression that, without relieving the stresses in the blanket 20 from about midway or more through the thickness of the blanket to the major surface penetrated and compressed by the sets 38 of compression-cutting blades, the stresses generated in the blanket 20 by the compression-cutting operation can form cracks and delaminations in the blanket. To prevent this from happening in the method of the subject invention, one or more longitudinally extending continuous stress relieving cuts, extending at least partially through (cuts 36 in FIG. 1) and preferably completely through (cuts 56 in FIG. 8) the thickness of the blanket 20, are made in the wider resilient fibrous insulation blanket 20 intermediate lateral edges of the wider resilient fibrous insulation blanket at the laterally spaced locations in the wider blanket that define the lateral edges of the pre-cut resilient fibrous insulation blankets 30 and, where included, the conventional uncut resilient fibrous insulation blankets 32 made from the wider resilient fibrous insulation blanket 20.

The longitudinally extending stress relieving cuts are made in the major surface of the wider resilient fibrous insulation blanket 20 that is penetrated by the sets 38 of compression-cutting blades to allow the lateral movement, intermediate the stress relieving cuts and the sets 38 of compression-cutting blades, of regions of the blanket from about midway or more through the thickness of the blanket to the major surface of the blanket penetrated by the sets of compression-cutting blades. The longitudinally extending stress relieving cuts thereby relieve lateral stresses in the resilient fibrous insulation blanket that might otherwise cause cracks in and the delamination of the blanket. The portion(s) of the wider blanket to become the pre-cut resilient fibrous insulation blanket(s) are then passed through a compression-cutting assembly between sets of circular compression-cutting blades and anvils to form at least one and typically two laterally spaced apart longitudinally extending series cuts and separable connectors in each of the portions of the wider blanket being made into a pre-cut resilient fibrous insulation blanket and at least two, typically at least three separable resilient fibrous insulation blanket sections in each of the portions of the wider blanket being made into a pre-cut resilient fibrous insulation blanket.

Where there are only partial cuts 36 made in the wider blanket 20 prior to compression-cutting the portions of the wider blanket that become the pre-cut resilient fibrous insulation blanket(s) 30, the partial cuts typically penetrate the blanket from one major surface of the blanket to within about one and one half inches and preferably about one half an inch of the other major surface of the blanket. The circular compression-cutting blades penetrate the same major surface of the blanket that contains the partial cuts 36 and the blanket is fully cut along the partial cuts to form cuts 58 prior to packaging or applying any facings to the unfaced pre-cut resilient fibrous insulation blankets thus formed.

In that part of the method of the subject invention for facing the pre-cut resilient fibrous insulation blanket(s) 30 and conventional uncut resilient fibrous insulation blankets 32 made from the wider blanket 20, the facings 60 are applied to the major surfaces of the pre-cut resilient fibrous insulation blankets 30 that pass over the anvil during the compression-cutting operation and not to the major surfaces of the pre-cut fibrous insulation blankets penetrated by the sets 38 of compression-cutting blades. In the compression-cutting operation forming the plurality of laterally spaced apart longitudinally extending series 48 of cuts and separable connectors in the blanket, the major surfaces of the blanket portions penetrated by the sets 38 of circular compression-cutting blades become temporarily depressed along each series 48 of cuts and separable connectors formed in the blanket portions so that the corresponding major surfaces of pre-cut resilient fibrous insulation blankets 30 formed are temporarily destabilized and temporarily no longer substantially flat or planar. While the major surfaces of pre-cut resilient fibrous insulation blankets 30 penetrated by the compression-cutting blades are no longer stable or flat, the major surfaces of the pre-cut resilient fibrous insulation blankets that pass over the anvil(s) remain flat and stable. Before the major surfaces of the pre-cut resilient fibrous insulation blankets penetrated by the compression-cutting blades have recovered to their substantially planar condition and become stabilized, facings 60 that are longitudinally separable at the locations of each series 48 of cuts and separable connectors in the pre-cut resilient fibrous insulation blankets are applied and adhered to the major surfaces of the pre-cut resilient fibrous insulation blankets that passed over the anvil(s). By applying the facings 60 to the major surfaces of the pre-cut resilient fibrous insulation blankets 30 which are still planar and stabilized, the facings 60 can be easily and precisely aligned with the pre-cut resilient fibrous insulation blankets 30 so that the facings overlay substantially the entire major surface and are separable along each of the series of cuts and separable connectors in the pre-cut resilient fibrous insulation blankets. Preferably, the conventional uncut resilient fibrous insulation blankets are also faced on their corresponding major surfaces.

The method of the subject invention will now be described in connection with the manufacturing operations schematically shown in FIGS. 1 and 2 and 8 and 9 and the blanket cross sections of FIGS. 3 to 7, and 10 to 14. FIGS. 1 and 2 show a portion of a manufacturing line wherein a wider resilient fibrous insulation blanket 20, is passed through a partial-cut stress relieving station 22, a compression-cutting station 24, a full cut severing station 26, and a facing application station 28. FIGS. 8 and 9 show a portion of a manufacturing line wherein a wider resilient fibrous insulation blanket 20, is passed through a full-cut stress relieving and severing station 122, a compression-cutting station 24, and a facing application station 28.

In both production lines, the resilient fibrous insulation blanket 20 is shown being made into a plurality of standard width pre-cut resilient fibrous insulation blankets 30 and conventional uncut resilient fibrous insulation blankets 32. Preferably, the resilient fibrous insulation blanket is a glass fiber resilient insulation blanket having a density between about 0.4 and 1.6 pounds per cubic foot (pcf); a width of up to 96 to 144 inches; and a nominal thickness from about 3 inches to 14 or more inches. The pre-cut resilient fibrous insulation blankets 30 and the conventional uncut resilient fibrous insulation blankets made from the wider blanket 20 typically have nominal widths of 15 or 23 inches. The longitudinally separable blanket sections formed by the plurality of laterally spaced apart longitudinally extending series of cuts and separable connectors in the pre-cut resilient fibrous insulation blankets 30 are typically between about 2½ to about 4½ inches in width, but may be up to about 12 inches in width.

Figure 5:
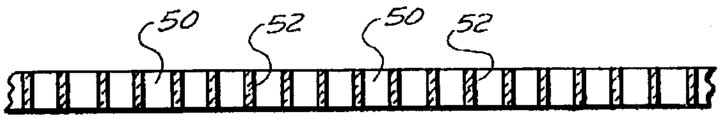
FIG. 5 is a schematic partial longitudinal cross section of the blanket in FIG. 4 taken substantially along lines 5—5 of FIG. 4.

As shown in FIGS. 1 and 2, in a first embodiment of the method of the subject invention, the uncut resilient fibrous insulation blanket 20 is successively fed through the partial-cut stress relieving station 22, the compression-cutting station 24, the severing station 26, and, when the pre-cut resilient fibrous insulation blankets 30 and the conventional uncut resilient fibrous insulation blankets 32 made in these stations are to be faced, through the facing application station 28. In the partial-cut stress relieving station 22, conventional motor driven rotary saw blades 34 cut part way through the blanket 20 and form the partial-cuts 36 shown in FIGS. 1 and 3 that relieve the lateral stresses in the blanket 20 during the subsequent compression-cutting operation. As discussed above, the partial-cuts 36 are laterally spaced across the width of the blanket 20 and not only relieve the stresses in the subsequent compression-cutting operation, but also define the lateral edges of the pre-cut and conventional uncut resilient fibrous insulation blankets 30 and 32 formed from the blanket 20. In the compression-cutting station 24, the portions of the resilient fibrous insulation blanket 20 being made into the pre-cut resilient fibrous insulation blankets 30 are compression-cut by sets 38 of compression-cutting blades 40 into a plurality of separable blanket sections 42. The compression-cutting blades 40 are urged by pneumatic cylinders 44 or other conventional mechanisms, into engagement with and driven by a moving anvil surface, such as a motor driven cylindrical anvil 46, as shown, a motor driven continuous anvil belt. With the compression-cutting blades 40 being driven by the moving surface of the anvil 46, which also passes the blanket 20 through the compression-cutting station, the compression-cutting blades 40 move at the same speed or substantially the same speed and in the same direction as the blanket 20 and do not tear the blanket. Each compression-cutting blade 40 forms a series 48 of alternating cuts 50 and separable connectors 52 in the blanket as shown in FIGS. 1 and 5. Each series 48 of cuts 50 and separable connectors 52 extend longitudinally and are laterally spaced from each other series 48 of cuts and separable connectors. The blanket sections 42 of each pre-cut resilient fibrous insulation blanket 30 made by the method of the subject invention can be separated from each other by hand by tearing or separating the pre-cut resilient fibrous insulation blanket along any of the series of cuts and separable connectors.

After the compression-cutting operation, the blanket 20 is passed through the severing station 26. In the severing station 26, motor driven rotary saw blades 54 in cooperation with rotating cylindrical anvils 55 or stationary anvils (not shown) cut completely through the thickness of the blanket 20 along the partial cuts 36 or water jets (not shown) cut completely through the blanket 20 along the partial cuts 36 to form cuts 58 in the blanket that completely sever the blanket 20 and complete the formation of the unfaced pre-cut and conventional uncut resilient fibrous insulation blankets 30 and 32 from the blanket 20. After the formation of the unfaced pre-cut and conventional uncut resilient fibrous insulation blankets 30 and 32 from the blanket 20 is completed and the unfaced pre-cut and conventional uncut resilient fibrous insulation blankets 30 and 32 are either conveyed to a packaging station (not shown) for packaging or are faced in the facing application station 28.

Figure 12:
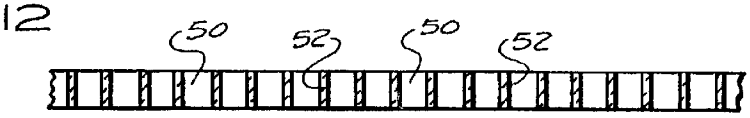
FIG. 12 is a schematic partial longitudinal cross section of the blanket in FIG. 11 taken substantially along lines 12—12 of FIG. 11.

As shown in FIGS. 8 and 9, in a second embodiment of the method of the subject invention, the uncut resilient fibrous insulation blanket 20 is successively fed through the full-cut stress relieving and severing station 122, the compression-cutting station 24, and, when the pre-cut resilient fibrous insulation blankets 30 and the conventional uncut resilient fibrous insulation blankets 32 made in these stations are to be faced, through the facing application station 28. In the full-cut stress relieving and severing station 122, conventional motor driven rotary saw blades 134 cooperate with rotating cylindrical anvils 135 or stationary anvils (not shown) to cut all of the way through the thickness of the blanket 20 or water jets (not shown) cut all of the way through the thickness of the blanket 20 and form the cuts 56 shown in FIGS. 8, 10, 11, 13 and 14 that relieve the lateral stresses in the blanket 20 during the subsequent compression-cutting operation. As discussed above, the cuts 56 are laterally spaced across the width of the blanket 20 and not only relieve the stresses in the subsequent compression-cutting operation, but also define the lateral edges of the pre-cut and conventional uncut resilient fibrous insulation blankets 30 and 32 formed from the blanket 20. In the compression-cutting station 24, the portions of the resilient fibrous insulation blanket 20 being made into the pre-cut resilient fibrous insulation blankets 30 are compression-cut by sets 38 of compression-cutting blades 40 into a plurality of separable blanket sections 42. The compression-cutting blades 40 are urged by pneumatic cylinders 44 or other conventional mechanisms, into engagement with and driven by a moving anvil surface, such as a motor driven cylindrical anvil 46, as shown, or a motor driven continuous anvil belt. With the compression-cutting blades 40 being driven by the moving surface of the anvil 46, which also passes the blanket 20 through the compression-cutting station, the compression-cutting blades 40 move at the same speed or substantially the same speed and in the same direction as the blanket 20 and do not tear the blanket. Each compression-cutting blade 40 forms a series 48 of alternating cuts 50 and separable connectors 52 in the blanket as shown in FIGS. 8 and 12. Each series 48 of cuts 50 and separable connectors 52 extend longitudinally and are laterally spaced from each other series of cuts and separable connectors. The blanket sections 42 of each pre-cut resilient fibrous insulation blanket 30 made by the method of the subject invention can be separated from each other by hand by tearing or separating the pre-cut resilient fibrous insulation blanket along any of the series of cuts and separable connectors. After the compression-cutting operation, the formation of the unfaced pre-cut and conventional uncut resilient fibrous insulation blankets 30 and 32 from the blanket 20 is completed and the unfaced pre-cut and conventional uncut resilient fibrous insulation blankets 30 and 32 are either conveyed to a packaging station (not shown) for packaging or are faced in the facing application station 28.

Where the pre-cut and conventional uncut resilient fibrous insulation blankets 30 and 32 formed by either the first or second embodiment of the method of the subject invention are to be faced, the blankets are faced in the same manner. The facing application station has a separate roll of facing for each pre-cut and conventional uncut resilient insulation blanket 30 and 32. While facings made of other materials may be used, preferably, the facings applied to the pre-cut and conventional uncut resilient fibrous insulation blankets 30 and 32 are made of kraft paper or a foil-scrim-kraft paper laminate.

Figure 6:
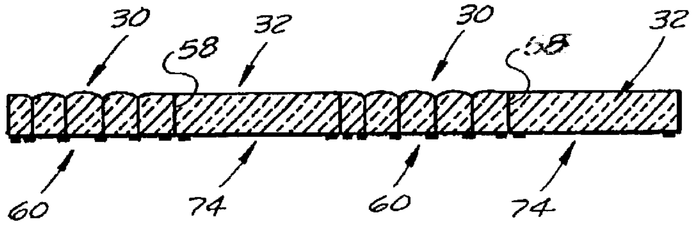
FIG. 6 is a schematic transverse cross section of the blankets being processed in FIG. 1 taken substantially along lines 6—6 of FIG. 1.
Figure 7:
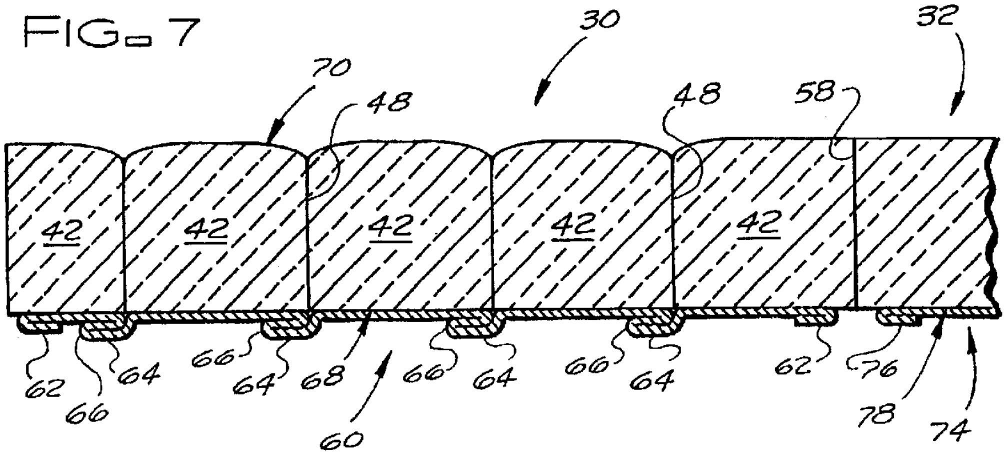
FIG. 7 is a partial view of FIG. 6 on a larger scale to better illustrate the facings on a pre-cut resilient fibrous insulation blanket and a conventional uncut resilient fibrous insulation blanket.
Figure 10:
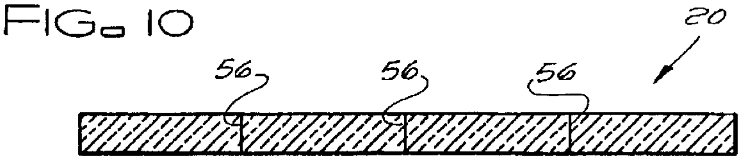
FIG. 10 is a schematic transverse cross section taken substantially along lines 10—10 of FIG. 8.
Figure 11:
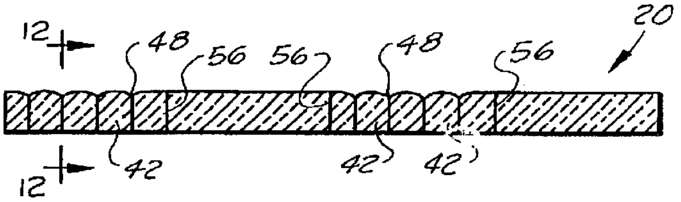
FIG. 11 is a schematic transverse cross section taken substantially along lines 11—11 of FIG. 8.
Figure 13:
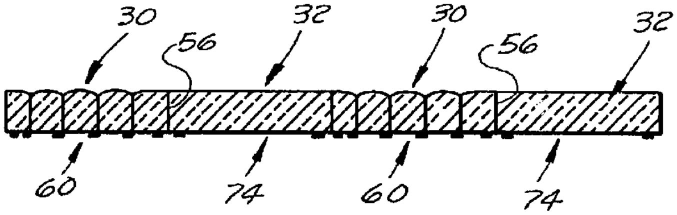
FIG. 13 is a schematic transverse cross section of the blankets being processed in FIG. 8 taken substantially along lines 13—13 of FIG. 8.
Figure 14:
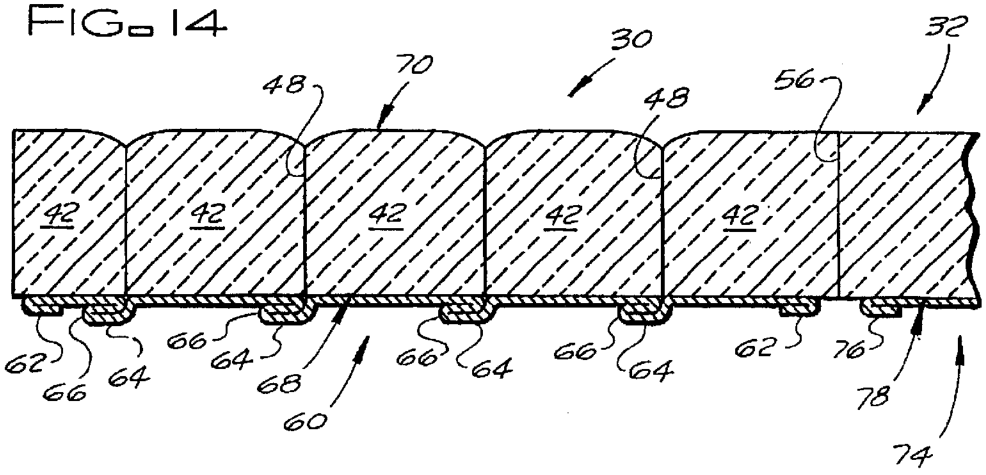
FIG. 14 is a partial view of FIG. 13 on a larger scale to better illustrate the facings on a pre-cut resilient fibrous insulation blanket and a conventional uncut resilient fibrous insulation blanket.

As shown in FIGS. 6 and 7 for the first method where the individual blankets 30 and 32 are separated by cuts 58 and FIGS. 13 and 14 for the second of the subject invention where the individual blankets 30 and 32 are separated by cuts 56, preferably, the facings 60 applied to the pre-cut resilient insulation blankets 30 each have longitudinally extending lateral tabs 62 and a pair of longitudinally extending tabs 64 that are longitudinally aligned with each series 48 of cuts and separable connectors in the pre-cut resilient fibrous insulation blanket 30 to which the facing is applied and bonded. The tabs of each pairs of tabs 64 are joined by a perforated line 66 that is separable by hand so that the sections 42 of the faced pre-cut resilient fibrous insulation blankets made by the method of the subject invention can be separated by hand along any of the series 48 of cuts and separable connectors in the blanket. Preferably, the perforations of the perforated lines 66 are sealed or filled with the bonding agent that bonds the facings to the pre-cut fibrous insulation blankets 30 so that the facing functions as a vapor barrier.

The facings 60 are aligned with and applied to the major surface 68 of each of the pre-cut resilient fibrous insulation blankets that passes over the anvil. Unlike the major surface 70 of each of the pre-cut resilient fibrous insulation blankets that is penetrated by the sets 38 of compression-cutting blades and is destabilized and deformed, the major surface 68 of the blanket that passes over the anvil is flat and stable. Thus, the facings 60 can be accurately aligned with and securely bonded to the major surface of 68 of the blanket with each pair 64 of tabs properly aligned with a series 48 of cuts and separable connectors. Preferably, the major surfaces of the facings 60 that are pressed into contact with the major surfaces 68 of the pre-cut fibrous insulation blankets 30 are coated with a bonding agent such as asphalt. Prior to being brought into contact with the major surfaces 68 of the pre-cut fibrous insulation blankets 30, the asphalt coatings are heated until tacky by passing the facings through heating units 72 e.g. heated roll(s).

As also shown in FIGS. 6 and 7 and 13 and 14, preferably, the facings 74 applied to the conventional uncut resilient insulation blankets 32 each have longitudinally extending lateral tabs 76. Preferably, the facings 74 are aligned with and applied to the major surface 78 of each of the conventional uncut resilient fibrous insulation blankets that correspond to the major surfaces 68 of the pre-cut resilient fibrous insulation blankets. Since these major surfaces are flat and stable, the facings 74 can be accurately aligned with and securely bonded to the major surface of 78. Preferably, the major surfaces of the facings 74 that are pressed into contact with the major surfaces 78 of the conventional uncut fibrous insulation blankets 32 are coated with a bonding agent such as asphalt. Prior to being brought into contact with the major surfaces 78 of the conventional uncut fibrous insulation blankets 32, the asphalt coatings are heated until tacky by passing the facings through heating units 72.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a faced pre-cut resilient fibrous insulation blanket with a facing adhered to one major surface wherein the faced pre-cut resilient fibrous insulation blanket has one or more longitudinally extending series of cuts and separable connectors intermediate lateral edges of the faced pre-cut resilient fibrous insulation blanket that form separable resilient fibrous insulation blanket sections in the faced pre-cut resilient fibrous insulation blanket and the facing is separable along each of the one or more longitudinally extending series of cuts and separable connectors so that the faced pre-cut resilient fibrous insulation blanket can be handled and installed as a unit or separated by hand, along any of the one or more longitudinally extending series of cuts and separable connectors, into faced resilient fibrous insulation blanket sections having widths less than a width of the faced pre-cut resilient fibrous insulation blanket, comprising:

providing an uncut resilient fibrous insulation blanket having a width;

making at least one longitudinally extending partial cut in the uncut resilient fibrous insulation blanket to form a partially cut resilient fibrous insulation blanket having a plurality of resilient fibrous insulation blankets, including a first resilient fibrous insulation blanket, with widths less than the width of the uncut resilient fibrous insulation blanket the partial cut being made in a major surface of the uncut resilient fibrous insulation blanket that forms the first major surface of the first resilient fibrous insulation blanket to relieve lateral stresses in the first resilient fibrous insulation blanket when the first resilient fibrous insulation blanket is compression-cut;

the first resilient fibrous insulation blanket having a substantially planar first major surface, and a substantially planar second major surface and lateral edges;

subsequent to making the partially cut resilient fibrous insulation blanket, passing the first resilient fibrous insulation blanket through a compression-cutting assembly and between a first circular compression-cutting blade and an anvil of the compression-cutting assembly; the compression-cutting blade having a series of compression-cutting teeth separated by a series of notches; compression-cutting the first resilient fibrous insulation blanket between the circular compression-cutting blade and the anvil to form a first longitudinally extending series cuts and separable connectors in the first resilient fibrous insulation blanket intermediate the lateral edges of the first resilient fibrous insulation blanket and two separable resilient fibrous insulation blanket sections in the first resilient fibrous insulation blanket; the circular compression-cutting blade penetrating the first resilient fibrous insulation blanket from the first major surface of the first resilient fibrous insulation blanket, the anvil supporting the second major surface of the first resilient fibrous insulation blanket, and the compression-cutting of the first resilient fibrous insulation blanket temporarily depressing the first major surface of the first resilient fibrous insulation blanket along the series of cuts and separable connectors so that the first major surface of the first resilient fibrous insulation blanket is temporarily no longer substantially planar;

providing a facing with a first longitudinally extending separable means separable longitudinally by hand intermediate lateral edges of the facing;

completely severing the partially cut resilient fibrous insulation blanket at the partial cut in the partially cut resilient fibrous insulation blanket subsequent to compression-cutting the first resilient fibrous insulation blanket and prior to applying and adhering the facing to the second major surface of the first resilient fibrous insulation blanket; and before the first major surface of the first resilient fibrous insulation blanket has recovered to the substantially planar condition, applying and adhering the facing to the second major surface of the first resilient fibrous insulation blanket with the first longitudinally extending separable means of the facing substantially aligned with the first series of cuts and separable connectors in the first resilient fibrous insulation blanket.

2. The method of making a faced pre-cut resilient fibrous insulation blanket according to claim 1, wherein:

the uncut resilient fibrous insulation blanket is a glass fiber insulation blanket between 0.4 and 1.6 pcf; and the uncut resilient fibrous insulation blanket has a nominal thickness of at least 3 inches.

3. The method of making a faced pre-cut resilient fibrous insulation blanket according to claim 1, wherein:

the first longitudinally extending separable means of the facing is a perforated line sealed with a bonding agent that bonds the facing to the second major surface of the pre-cut resilient fibrous insulation blanket so that the facing functions as a vapor barrier.

4. The method of making a faced pre-cut resilient fibrous insulation blanket according to claim 3, wherein:

the facing includes a pair of longitudinally extending tabs that are separable along the perforated line.

5. The method of making a faced pre-cut resilient fibrous insulation blanket according to claim 1, wherein:

the first resilient fibrous insulation blanket is passed between a plurality of laterally spaced circular compression-cutting blades, including the first circular compression-cutting blade, and the anvil in the compression-cutting assembly; and at least two laterally spaced apart longitudinally extending series of cuts and separable connectors, including the first series of cuts and separable connectors, are formed in the first resilient fibrous insulation blanket intermediate the lateral edges of the first resilient fibrous insulation blanket and at least three separable resilient fibrous insulation sections, including the two separable resilient fibrous insulation sections, are formed in the first resilient fibrous insulation blanket; and the facing has a plurality of longitudinally separable means, including the first longitudinally separable means, separable longitudinally by hand at laterally spaced apart locations across a width of the facing; and each of the longitudinally separable means is substantially aligned with one of the plurality of series of cuts and separable connectors in the first resilient fibrous insulation blanket.

6. The method of making a faced pre-cut resilient fibrous insulation blanket according to claim 5, wherein:

the uncut resilient fibrous Insulation blanket is a glass fiber insulation blanket between 0.4 and 1.6 pcf; and the uncut resilient fibrous insulation blanket has a nominal thickness of at least 3 inches.

7. The method of making a faced pre-cut resilient fibrous insulation blanket according to claim 5, wherein:

each of the longitudinally extending separable means of the facing is a perforated line sealed with a bonding agent that bonds the facing to the second major surface of the pre-cut resilient fibrous insulation blanket so that the facing functions as a vapor barrier.

8. The method of making a faced pre-cut resilient fibrous insulation blanket according to claim 7, wherein:

the facing includes pairs of longitudinally extending tabs with each pair of tabs being separable along one of the perforated lines.

9. The method of making a faced pre-cut resilient fibrous insulation blanket according to claim 1, wherein:

the uncut resilient fibrous insulation blanket is a glass fiber insulation blanket between 0.4 and 1.6 pcf; the uncut resilient fibrous insulation blanket has a nominal thickness of at least 3 inches; and the partial cut extends at least half way through a thickness of the uncut resilient fibrous insulation blanket.

10. The method of making a faced pre-cut resilient fibrous insulation blanket according to claim 1, wherein:

the uncut resilient fibrous insulation blanket is a glass fiber insulation blanket between 0.4 and 1.6 pcf; the uncut resilient fibrous insulation blanket has a nominal thickness of at least 3 inches; and the partial cut extends to within 1½ inches of the second major surface of the uncut resilient fibrous insulation blanket.

11. A method of making a faced pre-cut resilient fibrous insulation blanket with a facing adhered to one major surface wherein the faced pre-cut resilient fibrous insulation blanket has one or more longitudinally extending series of cuts and separable connectors intermediate lateral edges of the faced pre-cut resilient fibrous insulation blanket that form separable resilient fibrous insulation blanket sections in the faced pre-cut resilient fibrous insulation blanket and the facing is separable along each of the one or more longitudinally extending series of cuts and separable connectors so that the faced pre-cut resilient fibrous insulation blanket can be handled and installed as a unit or separated by hand, along any of the one or more longitudinally extending series of cuts and separable connectors, into faced resilient fibrous insulation blanket sections having widths less than a width of the faced pre-cut resilient fibrous insulation blanket, comprising:

providing an uncut resilient fibrous insulation blanket having a width;

making at least one longitudinally extending cut in the uncut resilient fibrous insulation blanket to completely sever the uncut resilient fibrous insulation blanket, to form a plurality of resilient fibrous insulation blankets, including a first resilient fibrous insulation blanket, with widths less than the width of the uncut resilient fibrous insulation blanket, and to relieve lateral stresses in the first resilient fibrous insulation blanket when the first resilient fibrous insulation blanket is compression-cut;

the first resilient fibrous insulation blanket having a substantially planar first major surface, a substantially planar second major surface, and lateral edges;

subsequent to making the cut in the uncut resilient fibrous insulation blanket, passing the first resilient fibrous Insulation blanket through a compression-cutting assembly and between a first circular compression-cutting blade and an anvil of the compression-cutting assembly; the compression-cutting blade having a series of compression-cutting teeth separated by a series of notches; compression-cutting the first resilient fibrous insulation blanket between the circular compression-cutting blade and the anvil to form a first longitudinally extending series cuts and separable connectors in the first resilient fibrous insulation blanket intermediate the lateral edges of the first resilient fibrous insulation blanket and two separable resilient fibrous insulation blanket sections in the first resilient fibrous insulation blanket; the circular compression-cutting blade penetrating the first resilient fibrous insulation blanket from the first major surface of the first resilient fibrous insulation blanket, the anvil supporting the second major surface of the first resilient fibrous insulation blanket, and the compression-cutting of the first resilient fibrous insulation blanket temporarily depressing the first major surface of the first resilient fibrous insulation blanket along the series of cuts and separable connectors so that the first major surface of the first resilient fibrous insulation blanket is temporarily no longer substantially planar;

providing a facing with a first longitudinally extending separable means separable longitudinally by hand intermediate lateral edges of the facing; and before the first major surface of the first resilient fibrous insulation blanket has recovered to the substantially planar condition, applying and adhering the facing to the second major surface of the first resilient fibrous insulation blanket with the first longitudinally extending separable means of the facing substantially aligned with the first series of cuts and separable connectors in the first resilient fibrous insulation blanket.

12. The method of making a faced pre-cut resilient fibrous insulation blanket according to claim 11, wherein:

the uncut resilient fibrous insulation blanket is a glass fiber insulation blanket between 0.4 and 1.6 pcf; and the uncut resilient fibrous insulation blanket has a nominal thickness of at least 3 inches.

13. The method of making a faced pre-cut resilient fibrous insulation blanket according to claim 12, wherein:

the first longitudinally extending separable means of the facing is a perforated line sealed with a bonding agent that bonds the facing to the second major surface of the pre-cut resilient fibrous insulation blanket so that the facing functions as a vapor barrier.

14. The method of making a faced pre-cut resilient fibrous insulation blanket according to claim 13, wherein:

the facing includes a pair of longitudinally extending tabs that are separable along the perforated line.

15. The method of making a faced pre-cut resilient fibrous insulation blanket according to claim 11, wherein:

the first resilient fibrous insulation blanket is passed between a plurality of laterally spaced circular compression-cutting blades, including the first circular compression-cutting blade, and the anvil in the compression-cutting assembly; and at least two laterally spaced apart longitudinally extending series of cuts and separable connectors, including the first series of cuts and separable connectors, are formed in the first resilient fibrous insulation blanket intermediate the lateral edges of the first resilient fibrous insulation blanket and at least three separable resilient fibrous insulation sections, including the two separable resilient fibrous insulation sections, are formed in the first resilient fibrous insulation blanket; and the facing has a plurality of longitudinally separable means, including the first longitudinally separable means, separable longitudinally by hand at laterally spaced apart locations across a width of the facing; and each of the longitudinally separable means is substantially aligned with one of the plurality of series of cuts and separable connectors in the first resilient fibrous insulation blanket.

* * * * *